United States Patent [19]

Agostini

[11] Patent Number: 4,674,079
[45] Date of Patent: Jun. 16, 1987

[54] AUTOMATIC DISC LOADING AND UNLOADING MECHANISM FOR RECORD PLAYER APPARATUS

[75] Inventor: Louis P. C. Agostini, Sint-Pieters Leeuw, Belgium

[73] Assignee: Staar S. A., Belgium

[21] Appl. No.: 829,973

[22] Filed: Feb. 18, 1986

[30] Foreign Application Priority Data

Apr. 23, 1985 [BE] Belgium ................................ 214895

[51] Int. Cl.$^4$ ...................... G11B 17/04; G11B 25/04
[52] U.S. Cl. ..................................... 369/77.1; 369/292
[58] Field of Search ...................... 369/77.1, 75.1, 292

[56] References Cited

U.S. PATENT DOCUMENTS

| | | | |
|---|---|---|---|
| 4,455,637 | 6/1984 | Suzuki et al. ...................... | 369/77.1 |
| 4,470,136 | 9/1984 | Takahashi et al. ................. | 369/77.1 |
| 4,486,873 | 12/1984 | Takahashi et al. ................. | 369/77.1 |
| 4,498,162 | 2/1985 | Schatteman ........................ | 369/77.1 |
| 4,523,306 | 6/1985 | Staar .................................... | 369/77.1 |

Primary Examiner—Steven L. Stephan
Attorney, Agent, or Firm—Leydig, Voit & Mayer

[57] ABSTRACT

An automatic loading and unloading mechanism for a slot-type record disc apparatus including three conical elements mounted in a mechanically variable triangle arrangement and having surfaces tapering inwardly in the upward direction and engaging the edge of a disc at an upper portion of said tapering surfaces to hold a disc when the disc is partially inserted into the slot of the apparatus; the conical elements are movable edgewise in the loading and unloading directions while maintained in contact at upper portions thereof with different portions of the edge of the disc as the conical elements move edgewise to move the disc to and from an intermediate position above a drive hub; the conical elements are movable radially outwardly relative to the center of a disc held by the conical elements to lower the disc between the intermediate position and an operating position on a drive hub caused by the edge of the disc riding down the tapered surfaces of the conical elements to lower portions thereof; the conical elements are movably radially inwardly to raise the disc from the operating position to the intermediate position in the ejecting operation caused by the edge of the disc riding up the tapered surfaces of the conical elements to the upper portions thereof; the tapered surfaces of the conical elements are moved away from contact with the edge of the disc when the disc is in the operating position to allow the disc to be rotated by the drive hub.

13 Claims, 10 Drawing Figures

AUTOMATIC DISC LOADING AND UNLOADING MECHANISM FOR RECORD PLAYER APPARATUS

TECHNICAL FIELD

This invention relates to record disc player apparatus and, more particularly, a loading and an unloading mechanism for such apparatus.

BACKGROUND ART

Generally, loading and unloading mechanism for record disc player apparatus provides horizontal and vertical displacements of discs to transfer a disc from a loading position to an operating position and for returning the disc from the operating position to the original loading position or position of ejection.

To achieve the displacements of the disc, the mechanism typically includes a mechanical and/or electromechanical means executing both displacements, which complicates the mechanism because it needs to act in both directions.

This complication reduces the reliability of such mechanism and prevents obtaining low manufacturing costs.

DISCLOSURE OF THE INVENTION

The main object of this invention is to overcome the above-stated drawbacks by providing a simple and reliable, low cost loading and unloading mechanism for record disc player apparatus.

A further object is to provide a loading and unloading mechanism which holds the disc positively during its displacement inwardly from a loading position to a position over the drive hub and during its displacement vertically into the operating position in engagement with the drive hub.

Another object is to provide a loading and unloading mechanism which can operate at any orientation, i.e., horizontal or vertical or at any angle therebetween, for record player apparatus intended for use in an environment where the record player apparatus is in motion, for example, in an automobile or on a water craft or aircraft, where the apparatus is not always horizontal during its operation.

In achieving these objects, according to the present invention the record disc is held by three conical elements supported in a mechanically variable triangle arrangement, the conical elements being supported in a loading triangle arrangement in which they engage the edge of a disc in the loading position at an upper portion of the tapered surfaces of the conical elements. During the loading operation, the disc is transferred in its own plane from the loading position to an intermediate position above the drive hub by edgewise movement of the conical elements to an intermediate triangle arrangement in which they engage different portions of the edge of the disc, and the disc is lowered from the intermediate to the operating position on the drive hub by moving the conical elements radially outwardly relative to the center of the disc to an operating triangle arrangement, causing the edge of the disc to ride down the tapered surfaces. During the unloading operation, the disc is raised from the operating position by radially inward movement of the conical elements causing the edge of the disc to ride up the tapered surfaces and then the disc is transferred linearly in its own plane to the original loading position or position of ejection by edgewise movements of the conical elements to their loading triangle arrangement. Accordingly, both horizontal and vertical displacements of the disc are performed by edgewise movements of the conical elements essentially in a single plane.

BRIEF DESCRIPTION OF THE DRAWINGS

Other advantages and features of the invention will be evident from the detailed description of the invention taken in conjunction with the accompanying drawings in which.

BEST MODE FOR CARRYING OUT THE INVENTION

Figure 1:
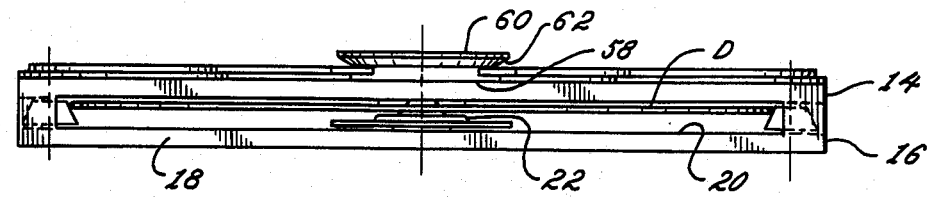
FIG. 1 is a front elevation view of a record player apparatus having a loading and unloading mechanism according to the invention.
Figure 2:
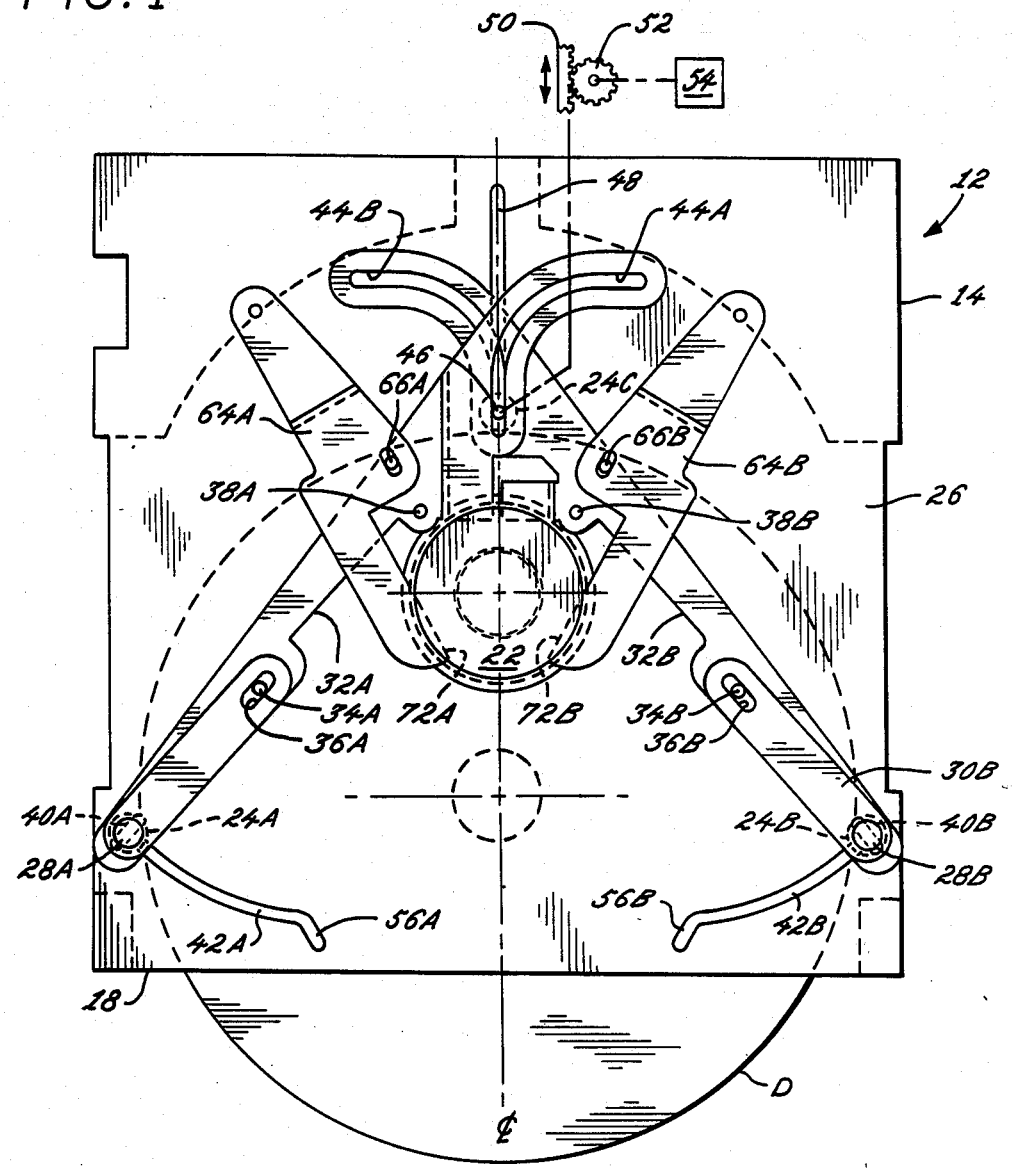
FIG. 2 is a top view of the apparatus illustrating the mechanism when the disc is partially inserted through an entrance slot at the start of operation or in a position when the disc has been ejected.

A record player apparatus is illustrated in FIGS. 1 and 2 having a housing 12 made of two hollow halves including an upper half 14 and a lower half 16 divided substantially along a disc insertion plane and having a front panel 18 with a slot 20 for receiving a disc D inserted edgewise through the slot 20 in the insertion plane. A disc D is shown partially inserted in loading position in FIGS. 1 and 2.

Driving means for a disc D includes a drive hub 22 located in the lower half of the housing on which a disc D is centered when in operating position in a plane parallel to the insertion plane and displaced therefrom.

Figure 3:
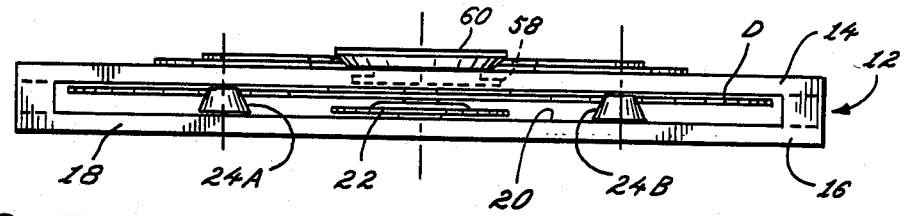
FIG. 3 is a front elevation view of the apparatus illustrating the mechanism in an intermediate position with the disc above the drive hub and in the insertion plane.

Loading and unloading mechanism is provided for moving the disc in the loading direction along a linear path in the insertion plane to a position (as shown in FIG. 3) above the drive hub 22 and perpendicularly relative to the insertion plane to the operating position on said drive hub. The mechanism moves the disc in the unloading direction by raising the disc D from the operating position to the intermediate position shown in FIG. 3 in the insertion plane and linearly in the insertion plane to the original position partially projecting through the slot, as shown in FIG. 1.

According to the present invention, the mechanism for moving the disc in the loading and unloading directions includes three conical elements 24A, 24B, 24C mounted in a delta arrangement at the vertices of a mechanically variable triangle, the three conical elements 24A, 24B, 24C being engageable with the edge of the disc D and being movable to guide the disc during its loading and unloading movement. Referring to FIG. 1, a pair of the conical elements 24A, 24B are visible through the entrance slot 20 and are located opposite one another adjacent the lateral sides of a disc D in the entrance slot. All three conical elements are located on vertical axes with their tapered outer surfaces engaging the edge of a disc D. As seen in FIG. 1, the disc D is engaged by the conical elements close to their upper ends when the disc D is in the insertion plane.

The third conical element 24C, which is centrally located, appears in the top plan view of FIG. 2 and engages the leading edge of the disc when it is partially inserted through the slot. In FIG. 2, the three conical elements 24A, 24B, 24C are supported in a loading triangle arrangement with the pair of conical elements 24A, 24B which are oppositely arranged positioned symmetrically with respect to an apparatus center line CL bisecting the disc while the third central conical element 24C is located on the center line. The conical elements are suspended beneath the top plate 26 of the upper housing half 14, the pair of oppositely arranged elements 24A, 24B being mounted by means of pins 28A, 28B connected to slide members 30A, 30B located on opposite lateral sides of the apparatus and above the top plate 26 of the upper housing half 14. Also mounted on top of the upper housing half 14 and underneath the slide members 30A, 30B are a pair of large pivotally mounted, oppositely arranged levers 32A, 32B which are used for coordinating the movement of the three conical elements 24A, 24B, 24C.

For this purpose, the displacement of the slide members 30A, 30B and the pair of conical elements 24A, 24B carried thereby is guided by the engaging of studs 34A, 34B mounted on the coordinating levers 32A, 32B and located in guide slots 36A, 36B in the slide members. The pivotally mounted coordinating levers 32A, 32B pivot around pins 38A, 38B located on the top plate 26 of the upper housing half 14. The mounting pins 28A, 28B for the oppositely arranged pair of conical elements 24A, 24B pass through slots 40A, 40B in the associated pivotally mounted lever and through curved slots 42A, 42B in the top plate 26 of the upper housing half 14. For guiding the movement of the third central conical element 24C and coordinating the movement of all three conical elements 24A, 24B, 24C, oppositely curved slots 44A, 44B in curved ends of the coordinating levers 32A, 32B intersect and a single pin 46, which carries the central conical element 24C, goes through the two intersecting slots 44A, 44B and through a straight slot 48 along the center line of the top plate 26. This mounting pin 46 for the third central conical element 24C is connected to a power unit, herein shown as a rack 50 driven by a pinion 52 from a drive motor 54 shown diagrammatically in FIG. 2, which operates the mechanism by moving the third central conical element mounting pin 46 to move all three conical elements 23A, 24B, 24C and a record disc D supported thereby through the loading and unloading operations.

Figure 4:
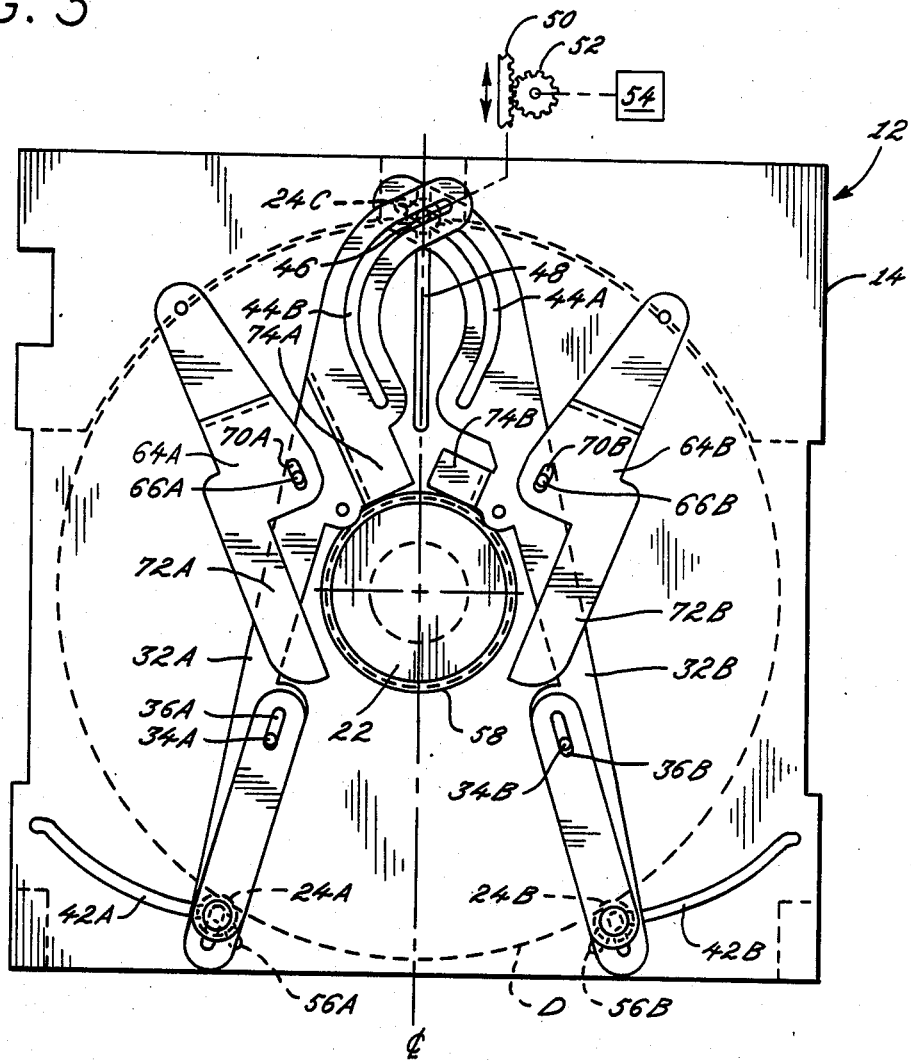
FIG. 4 is a top view of the apparatus illustrating the mechanism in the position shown in FIG. 3.
Figure 5:
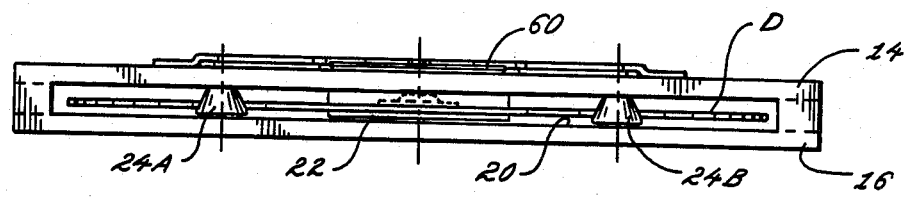
FIG. 5 is a front elevation view of the apparatus illustrating the mechanism when the disc is in its operating position.

When a disc is partially inserted in the entrance slot 20 to the loading position in which it is shown in FIG. 2, the edge of the disc is engaged by the tapered surfaces of the three conical elements 24A, 24B, 24C which are supported in their loading triangle arrangement, and the disc is held stably thereby in this loading position. To move the disc in the insertion plane, the drive motor 54 is operated to move the mounting pin 46 carrying the central conical element 24C linearly in the loading direction along the linear slot 48 in the top plate 26 of the housing 12. By interengaging the curved slots 44A, 44B in the coordinating levers 32A, 32B, these levers are caused to pivot about their mounting pins 38A, 38B which causes inward movement of the pair of opposed conical elements 24A, 24B along the curved path defined by the curved slots 42A, 42B in the top plate 26 of the upper housing half 14. As the pair of opposed conical elements 24A, 24B move inwardly along the curved slots 42A, 42B, they continue to engage the edge of the record disc and are maintained in a delta arrangement, as shown in FIG. 4 which illustrates the record disc in an intermediate position above the drive hub. However, the delta arrangement has varied in size from the original arrangement shown in FIG. 2 since the disc is entirely within the housing, as shown in FIG. 4, and the pair of opposed conical elements 24A, 24B have been displaced inwardly toward the center line CL so that their spacing is closer in FIG. 4 than in the arrangement shown in FIG. 2 where they are spaced substantially the full diameter of the disc and engage the disc at its outer edge substantially along a transverse center line so that they are spaced substantially the full diameter of the record disc. In FIG. 4, however, the laterally opposed conical elements 24A, 24B are spaced substantially closer together and the central conical element 24C at the top of FIG. 4 is spaced substantially the full diameter of the record disc from each of the pair of opposed conical elements 24A, 24B. Thus, the three conical elements are maintained in engagement with the edge of the disc and move through a mechanically variable triangle in the course of linear movement of the disc from the operative loading position shown in FIG. 2 to the intermediate triangle arrangement shown in FIG. 4 where the disc is supported above the drive hub 22 and vertically spaced therefrom, as shown in FIG. 3.

Figure 6:
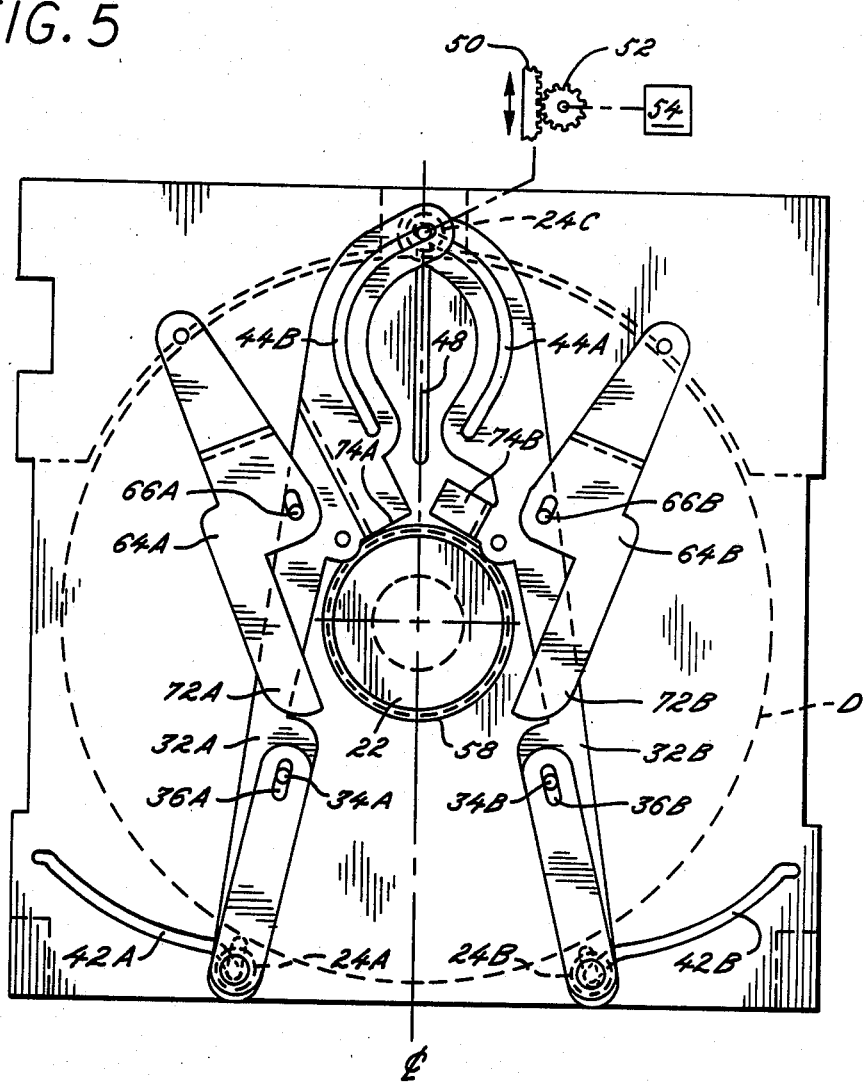
FIG. 6 is a top view of the apparatus illustrating the mechanism in the position shown in FIG. 5.

For displacing the record disc perpendicularly relative to the insertion plane from the intermediate position shown in FIG. 4 to the operating position shown in FIG. 6, all three conical elements 24A, 24B, 24C are moved radially outwardly relative to the center of the disc held by the conical elements so as to provide movement of the disc in the perpendicular direction, the tapered surfaces of the conical elements remaining in contact with the disc to guide the disc in its perpendicular movement. The radially outward movement of the conical elements is achieved by movement of the central conical element 24C caused by the drive motor 54 through the drive such that the coordinating levers 32A, 32B are pivoted further inwardly toward the center line CL and the mounting pins 28A, 28B for the pair of opposed conical elements 24A, 24B are caused to enter straight sections 56A, 56B of the curved slots 42A, 42B in the top plate, which straight slot sections 56A, 56B are so located as to guide the pair of opposed conical elements 24A, 24B radially outwardly relative to the center of the disc. Similarly, the central conical element 24C is moved radially outwardly relative to the center of the disc from the position shown in FIG. 4 (at the top of the Figure) to the position shown in FIG. 6. In the final portion of the radially outward movement of the conical elements 24A, 24B, 24C, they separate from the edge of the disc to release the disc after it has been centered on the drive hub 22 so that they no longer remain in contact with the disc and allow the disc to be rotated by the drive means when the disc is in the operating position, the conical elements 24A, 24B, 24C reaching an operating triangle arrangement.

Means are provided for clamping the disc on the drive hub 22, herein shown as a clamping magnet 58. Means are also provided for raising and lowering the clamping magnet 58 during the course of movement of the disc to and from the operating position. The clamping magnet 58 is provided with a guide member 60 located above the magnet 58 which has an outwardly tapering conical surface 62. This surface 62 is engaged by clamping magnet guide levers 64A, 64B pivotally mounted on pins on the top plate 26. The pivoting of these guide levers 64A, 64B is caused by means of studs 66A, 66B mounted on the coordinating levers 32A, 32B and which pass through slots 70A, 70B in said guide levers. The guide levers 64A, 64B have operative ends 72A, 72B which fit against the conical guiding surface 62 of the guide member 60 for the clamping magnet. As shown in FIG. 2, the guide levers 64A, 64B are positioned with their operative ends 72A, 72B inwardly in engagement with the guide member 60 for the clamping magnet so as to hold the clamping magnet in a raised position above the drive and above the insertion plane of the record disc. During the course of movement of the record disc from the loading position shown in FIG. 2 to the intermediate position shown in FIG. 4, the guide levers 64A, 64B move outwardly so as to release the clamping magnet 58 to be held by tabs 74A, 74B on the coordinating levers 32A, 32B. The arrangement is such that the clamping magnet 58 is held free and clear of the record disc until the disc approaches the operating position. In the final movement of the coordinating levers 32A, 32B, which moves the pair of opposed conical elements 24A, 24B and the central conical element 24C radially outwardly, allowing the disc to drop onto the drive hub 22, the tabs 74A, 74B on the coordinating levers 32A, 32B swing radially away from the guide member 60 for the clamping magnet 58, thus allowing the clamping magnet 58 to move downwardly and clamp the record disc on the drive hub 22.

In the unloading operation, by operation of the drive motor 54, the coordinating levers 32A, 32B are pivoted to return the mounting pins 28A, 28B for the opposed conical elements 24A, 24B along the straight sections 56A, 56B of the guide slots, and all three conical elements are moved radially inwardly relative to the disc. The tabs 74A, 74B also move into engagement with the clamping magnet operating member 60 and raise the clamping magnet above the disc, releasing the disc and causing the edge of the disc to ride upwardly on the tapered outer surfaces of the conical elements 24A, 24B, 24C as these elements move inwardly, raising the disc to the intermediate position in the insertion plane. Completion of the unloading operation is carried out by movement of the conical elements edgewise from the intermediate triangle arrangement of FIG. 4 to the loading triangle arrangement of FIG. 2 by operation of the motor 54 and movement of the central conical element 24C which, in effect, pushes the edge of the disc and moves the disc in the insertion plane to the original loading position, thereby ejecting the front edge of the disc from the entrance slot 20 so that it projects from the housing 12.

Figure 7:
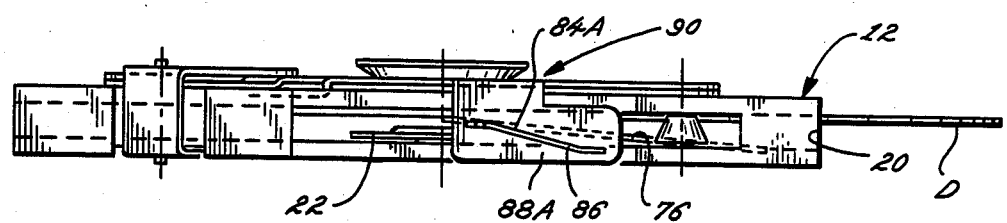
FIG. 7 is a side elevation view of another embodiment of record player apparatus according to the present invention.
Figure 8:
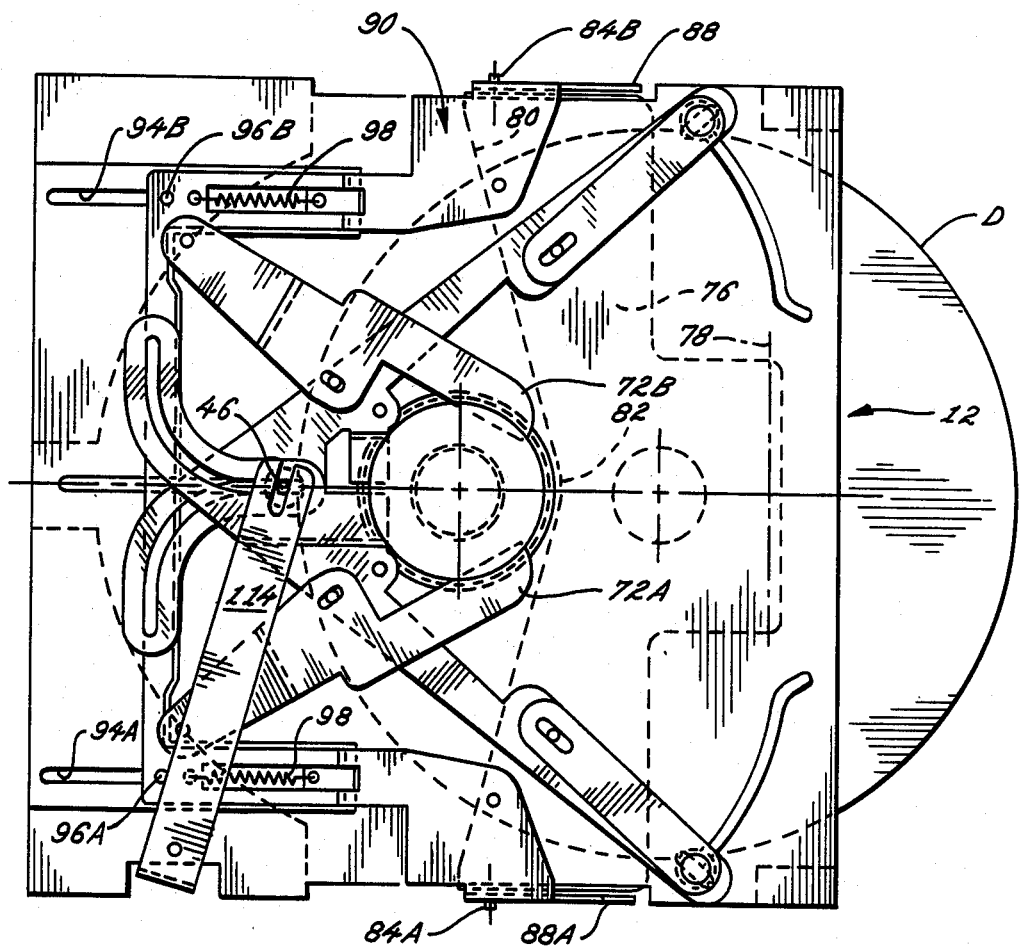
FIG. 8 is a top view of the apparatus illustrating the mechanism in the position shown in FIG. 7.

Turning now to FIGS. 7 and 8, means are shown for ensuring that the disc is located in the insertion plane and above the drive hub 22 when it is inserted through the entrance slot 20 so that the disc is kept clear of the drive hub assembly 22 as it is inserted. For this purpose, a flap 76 pivotally mounted for rotation about a horizontal axis 78 is provided. The flap 76 is mounted, as shown in FIG. 7, adjacent the front portion of the housing 12 so that as a disc D is inserted it comes into engagement with a V-shaped edge 80 of the flap, the V-shaped edge 80 with the apex 82 downward being provided so that the disc engages the flap 76 only at the lateral edges of the disc. The flap 76 is pivotally mounted so that it drops downwardly to release the disc for its perpendicular movement from the intermediate position to the operating position. For carrying out the pivoting movement of the flap, two lateral studs 84A, 84B are provided at the laterally opposite edges of the flap which cooperate with inclined slots 86 in downwardly turned sides 88A, 88B of a slidable member 90 mounted on the top of the top plate 26 on the upper housing half of the unit and guided longitudinally of the housing by slots 94A, 94B in the top plate 26 of the housing which cooperate with studs 96A, 96B which extend through the slots from the slidable member 90. A pair of springs 98 are provided which normally urge the slidable member 90 toward the front of the housing, to the right in FIG. 7.

To lower the flap 76, the slide member 90 is driven toward the back of the housing 12, to the left in FIG. 7, against the tension force exerted by the pair of springs 98.

Figure 9:
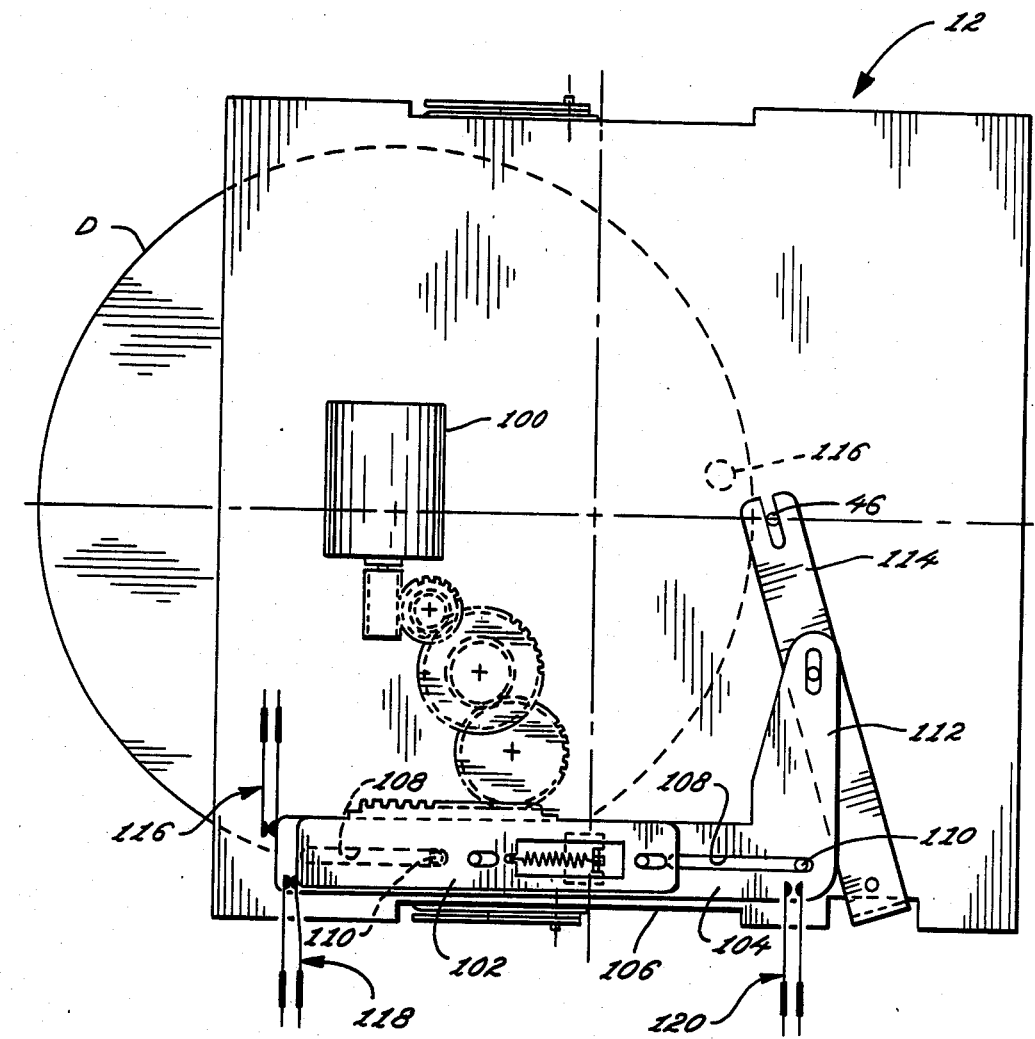
FIGS. 9 and 10 are bottom views of the apparatus of FIGS. 7 and 8.
Figure 10:
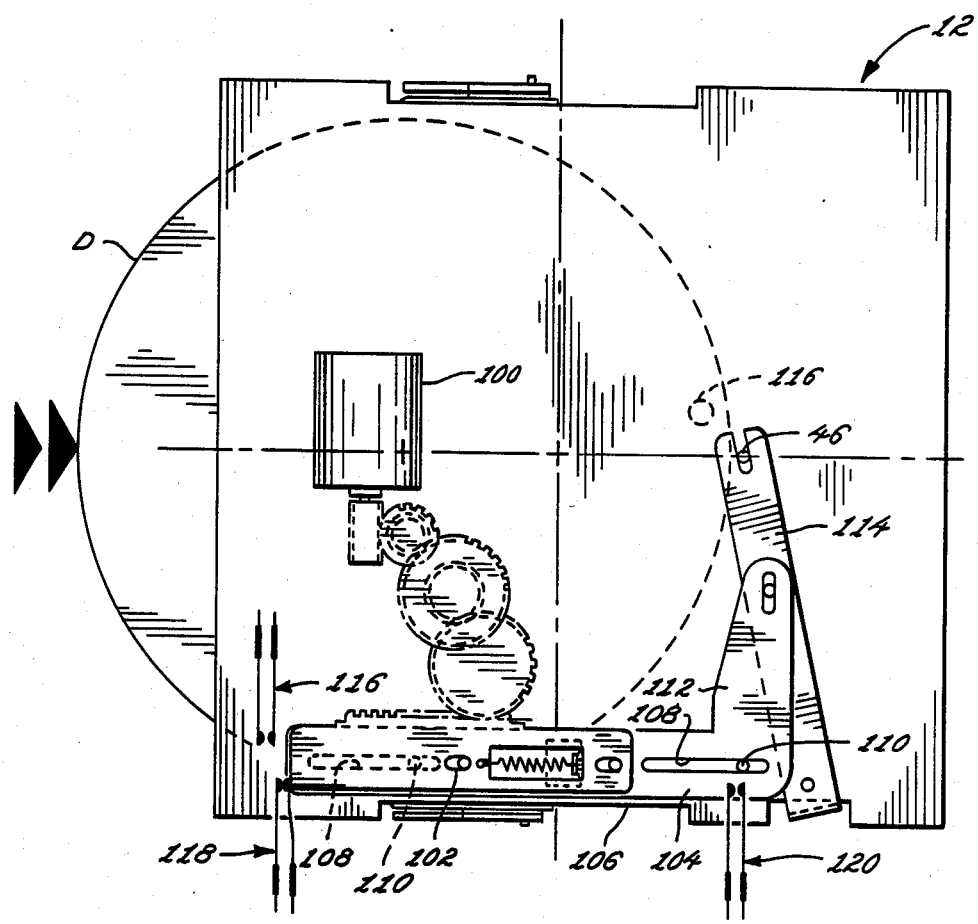

For powering the loading and unloading mechanism, including the flap 76 for guiding the disc during insertion to ensure that it does not come into engagement with the drive hub 22, a drive system may be provided, as shown in FIGS. 9 and 10. These are bottom views of the apparatus shown in FIGS. 7 and 8, and the power for driving the mechanism is provided by a micromotor 100 energized from any suitable source of power, such as a battery or AC source. The motor 100 is connected to a first slide member 102 mounted on the underside of the housing and cooperating with an L-shaped slide member 104 also mounted for linear movement on the underside of the housing 12 between the slide member 102 and the bottom plate 106 of the housing 12. The members 102, 104 are guided and maintained by slots 108 cooperating with studs 110 on the plate 106 and the members. For transmitting the motion of the slide member 102 to the loading and unloading mechanism, the offset arm 112 of the L-shaped slide member 104 is connected to a pivotal lever 114 having a fork at one end which straddles the mounting pin 46 for the central conical element 24C of the mechanism. By operation of the motor 100, therefore, the first slide member 102 is caused to reciprocate, thus pivoting the forked lever 114 and causing the central conical element 24C to move linearly within the housing 12. That movement of the central conical element 24C is translated through the coordinating levers 32A, 32B to movement of the pair of opposed conical elements 24A, 24B and the linear movement in its own plane of the record disc followed by perpendicular movement to place the disc on the drive hub 22 in the operating position.

In the operation of the apparatus, an optodetector 116, diagrammatically illustrated in FIG. 9, is utilized to sense the edge of a disc as it is inserted and reaches the central conical element 24C and closes the power supply to the motor 100 to drive the motor and move the first slide member 102 from the front toward the back of the housing 12, to the right in FIG. 9. This causes the L-shaped slide member 104 to move toward the back of the housing 12, to the right in FIG. 9, which ensures rotation of the forked lever 114 and causes the central conical element 24C and, through the coordinating levers 32A, 32B, the pair of opposed conical elements 24A, 24B in the delta arrangement, to move the disc laterally and then perpendicularly from the insertion position to the final operating position.

In the event the disc is quickly pushed in by the user, the forked lever 114 will be slightly rotated and the L-shaped slide member 104 moved to the right (FIG. 9) with the result that the normally closed limit switch 116, which is engaged by the left end of the L-shaped member 104 (FIG. 9), is opened, which will power the motor 100 and cause the delta mechanism to be operated. Limit switches 118, 120, also shown in FIG. 9, ensure the switching off of the motor supply at the end of the loading and unloading sequences.

I claim:

1. An automatic loading and unloading mechanism for a slot-type record disc apparatus comprising:

a housing having an upper half and a lower half divided substantially along a disc insertion plane, a slot defined in a front panel of said housing along said plane for receiving a disc inserted edgewise through said slot along an insertion path in said plane, drive means including a drive hub for a disc located in said lower half of said housing and adapted to drive a disc when in an operating plane parallel to said insertion plane and displaced therefrom, loading and unloading means including three conical elements mounted in a mechanically variable triangle arrangement in said housing and having surfaces tapering inwardly in the upward direction and engaging the edge of a disc at an upper portion of said tapering surfaces to hold a disc when the disc is partially inserted into said slot and in a loading position, means for holding said disc by said conical elements and for moving said disc from said loading position along said insertion path to an intermediate position above said drive hub and perpendicularly relative to said insertion plane to said operating plane on said drive hub including:

means for moving said conical elements edgewise in the direction of said path from a loading triangle arrangement to an intermediate triangle arrangement while coordinating the movement of said conical elements to maintain a geometrically variable triangle with the conical elements in contact at upper portions thereof with different portions of the edge of the disc as the conical elements move edgewise to move said disc to an intermediate position above said drive hub, and for moving said conical elements radially outwardly relative to the center of the disc held by said conical elements while retaining a triangular arrangement causing the edge of said disc to ride downwardly into contact with a lower portion of said tapered surfaces of said conical elements to lower said disc to said operating plane and onto said drive hub, the tapered surfaces of the conical elements moving away from contact with the edge of the disc to allow the disc to be rotated by the drive hub.

2. An automatic loading and unloading mechanism according to claim 1 including drive means and coordinating levers for moving said conical elements in a variable triangle dimensioned such that said conical elements remain in contact with the edges of the disc until said disc is lowered onto said drive hub and are released from contact with said disc to allow said disc to be rotated by said drive hub when in its operating plane.

3. An automatic loading and unloading mechanism according to claim 1 wherein a pair of said conical elements are located symmetrically with respect to a center line bisecting a disc in said partially inserted position in the slot and the third conical element is centrally located on said center line.

4. An automatic loading and unloading mechanism for a slot-type record disc apparatus including three conical elements mounted in a mechanically variable triangle arrangement and having surfaces tapering inwardly in the upward direction and engaging the edge of a disc at an upper portion of said elements to hold a disc when the disc is partially inserted into the slot of the apparatus;

means for moving the conical elements edgewise in loading and unloading directions while maintaining the elements in contact at upper portions thereof with different portions of the edge of the disc to move the disc in its own plane to and from an intermediate position above a drive hub; and means for moving the conical elements radially relative to the center of a disc held by the conical elements to lower the disc between the intermediate position and an operating position on said drive hub caused by the edge of the disc riding down the tapered surfaces of the conical elements to lower portions thereof and to raise the disc from the operating position to the intermediate position in an ejecting operation caused by the edge of the disc riding up the tapered surfaces of the conical elements to the upper portions thereof.

5. An automatic loading and unloading mechanism according to claim 4 including means for moving the conical elements away from the edge of the disc when the disc is on the drive hub to allow the disc to be rotated by the drive hub.

6. An automatic loading and unloading mechanism according to claim 4 including drive means and coordinating levers for moving said conical elements in a variable triangle dimensioned such that said conical elements remain in contact with the edges of the disc until said disc is lowered onto said drive hub and are released from contact with said disc to allow said disc to be rotated by said drive hub when in its operating plane.

7. A loading and unloading mechanism according to claim 6 including means for pivotally mounting said coordinating levers, said levers having intersecting slots shaped as arcs of circles, a pin for mounting one of said conical elements passing through said intersecting slots of said levers at the point of intersection, said pin being mounted for linear movement, motor driven means for moving said pin linearly and for producing the coordinating movement of said coordinating levers, slide members carrying two of said conical elements, and means connecting said coordinating levers to move said slide members and said two conical elements thereby moving all three conical elements edgewise upon power driven movement of said mounting pin toward said first mentioned conical element.

8. A loading and unloading mechanism according to claim 7 including a housing for said mechanism having a top plate with slots for guiding the displacement of all three conical elements.

9. A loading and unloading mechanism according to claim 4 wherein said apparatus includes a clamping magnet adapted to be raised and lowered relative to said drive hub, and means operated by said mechanism for raising and lowering said clamping magnet coordinated with the movement of the disc.

10. An automatic loading and unloading mechanism according to claim 4 wherein a pair of said conical elements are mounted on a pair of pivotable coordinating levers each including at one end an arcuate slot for controlling the pivoting movement thereof and carrying at the other end a slide member carrying one of said conical elements.

11. An automatic loading and unloading mechanism according to claim 10 further including a housing, and guide slots located in a top plate of said housing for guiding said coordinating levers and conical elements associated therewith between said triangle arrangements.

12. An automatic loading and unloading mechanism according to claim 4 further including a member mounted for pivotal movement from a position intersecting a disc when inserted in the slot of said apparatus to maintain the disc above said drive hub upon its movement from the loading to the intermediate position, and movable to a lower position to allow the disc to be lowered from the intermediate position to the position on the drive hub.

13. An automatic loading and unloading mechanism according to claim 12 further including power driven means for moving said flap coordinated with the movement of said disc.

* * * * *